(12) United States Patent
Yang et al.

(10) Patent No.: US 9,291,330 B2
(45) Date of Patent: Mar. 22, 2016

(54) RETROFIT-STYLE LAMP AND FIXTURE, EACH INCLUDING A ONE-DIMENSIONAL LINEAR BATWING LENS

(71) Applicants: Yi Yang, Mechanicsburg, PA (US); Douglas Harriott, Melrose, MA (US); Li Li, Somerville, MA (US)

(72) Inventors: Yi Yang, Mechanicsburg, PA (US); Douglas Harriott, Melrose, MA (US); Li Li, Somerville, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 308 days.

(21) Appl. No.: 13/770,297

(22) Filed: Feb. 19, 2013

(65) Prior Publication Data
US 2013/0163245 A1    Jun. 27, 2013

Related U.S. Application Data

(63) Continuation of application No. 12/636,524, filed on Dec. 11, 2009.

(51) Int. Cl.
*F21V 5/04* (2006.01)
*F21S 4/00* (2006.01)
(Continued)

(52) U.S. Cl.
CPC ... *F21V 5/04* (2013.01); *F21K 9/17* (2013.01); *F21S 4/008* (2013.01); *F21V 3/02* (2013.01);
(Continued)

(58) Field of Classification Search
CPC ............. F21V 5/043; F21V 3/02; F21V 3/04; F21V 29/004; F21Y 2103/003; F21W 2131/00; F21K 9/17

USPC ............................................ 362/235, 249.02
See application file for complete search history.

(56) References Cited

U.S. PATENT DOCUMENTS 2,215,900 A    9/1940    Bitner
2,254,961 A    9/1941    Harris
(Continued)

FOREIGN PATENT DOCUMENTS

CN    201242087 Y    5/2009
DE    297 17 444 U1    2/1998
(Continued)

OTHER PUBLICATIONS

Klaus Schmid, International Search Report and Written Opinion of the International Searching Authority for PCT/US2010/060156, Apr. 8, 2011, pp. 1-10, European Patent Office, Rijswijk, The Netherlands.
(Continued)

*Primary Examiner* — Anabel Ton
(74) *Attorney, Agent, or Firm* — Shaun P. Montana (57) ABSTRACT

A retrofit-style lamp is disclosed. The retrofit-style lamp includes a plurality of light sources, and a one-dimensional linear batwing lens. The one-dimensional linear batwing lens beam shapes light emitted by at least two light sources of the plurality of light sources. The retrofit-style lamp also includes a housing including the plurality of light sources, and attached to the one-dimensional linear batwing lens. The combination of housing and lens is then itself fitted with endcaps, including electrical connectors, for placement within a fixture, such as within an existing conventional fluorescent tube fixture located within a storage structure, for example a refrigeration case. Alternatively, the plurality of light sources, the one-dimensional linear batwing lens, and the housing may be formed, along with a power supply, as a standalone retrofit fixture for use in enclosed storage structures, such as refrigeration cases, where the retrofit fixture replaces a conventional fluorescent fixture.

17 Claims, 4 Drawing Sheets

(51) Int. Cl.
    *F21V 3/02*     (2006.01)
    *F21V 3/04*     (2006.01)
    *G02B 19/00*     (2006.01)
    *F21K 99/00*     (2010.01)
    *F21V 15/01*     (2006.01)
    *F21V 17/10*     (2006.01)
    *F21V 29/00*     (2015.01)
    *F21W 131/305*     (2006.01)
    *F21Y 101/02*     (2006.01)
    *F21Y 103/00*     (2006.01)

(52) U.S. Cl.
    CPC .............. *F21V 3/04* (2013.01); *G02B 19/0028* (2013.01); *G02B 19/0066* (2013.01); *F21V 15/013* (2013.01); *F21V 17/104* (2013.01); *F21V 29/004* (2013.01); *F21W 2131/305* (2013.01); *F21Y 2101/02* (2013.01); *F21Y 2103/003* (2013.01)

(56) References Cited

U.S. PATENT DOCUMENTS

| | | | |
|---|---|---|---|
| 2,356,654 A | 8/1944 | Cullman | |
| 2,469,080 A | 5/1949 | Rosin et al. | |
| 2,515,584 A | 7/1950 | Benson | |
| 3,348,264 A | 10/1967 | Rice et al. | |
| 4,414,609 A | 11/1983 | Shemitz | |
| 4,667,481 A | 5/1987 | Watanabe et al. | |
| 4,767,172 A | 8/1988 | Nichols et al. | |
| 4,907,044 A | 3/1990 | Schellhorn et al. | |
| 5,027,258 A | 6/1991 | Schoniger et al. | |
| 5,079,680 A | 1/1992 | Kohn | |
| 5,471,372 A | 11/1995 | Mamelson et al. | |
| 5,526,190 A | 6/1996 | Hubble, III et al. | |
| 5,607,227 A | 3/1997 | Yasumoto et al. | |
| 6,179,434 B1 | 1/2001 | Saraiji | |
| 6,547,423 B2 | 4/2003 | Marshall et al. | |
| 6,578,979 B2 | 6/2003 | Truttmann-Battig | |
| 6,582,103 B1 | 6/2003 | Popovich et al. | |
| 6,632,100 B1 | 10/2003 | Richardson | |
| 6,638,088 B1 | 10/2003 | Richardson | |
| 6,641,419 B1 | 11/2003 | Richardson | |
| 6,724,543 B1 | 4/2004 | Chinniah et al. | |
| 6,755,556 B2 | 6/2004 | Gasquet et al. | |
| 6,762,562 B2 | 7/2004 | Leong | |
| 6,773,130 B1 | 8/2004 | Richardson | |
| 6,853,151 B2 | 2/2005 | Leong et al. | |
| 6,896,381 B2 | 5/2005 | Benitez et al. | |
| 6,936,968 B2 | 8/2005 | Cross et al. | |
| 6,953,271 B2 | 10/2005 | Aynie et al. | |
| 7,021,797 B2 | 4/2006 | Minano et al. | |
| 7,067,992 B2 | 6/2006 | Leong et al. | |
| 7,111,964 B2 | 9/2006 | Suehiro et al. | |
| 7,121,675 B2 | 10/2006 | Ter-Hovhannisian | |
| 7,254,309 B1 | 8/2007 | Chou et al. | |
| 7,267,461 B2 | 9/2007 | Kan et al. | |
| 7,270,454 B2 | 9/2007 | Amano | |
| 7,329,029 B2 | 2/2008 | Chaves et al. | |
| 7,348,723 B2 | 3/2008 | Yamaguchi et al. | |
| 7,465,074 B2 | 12/2008 | Blumel | |
| 7,473,013 B2 | 1/2009 | Shimada | |
| 7,490,957 B2 | 2/2009 | Leong et al. | |
| 7,507,001 B2 | 3/2009 | Kit | |
| 7,559,672 B1 | 7/2009 | Parkyn et al. | |
| 7,731,395 B2 | 6/2010 | Parkyn et al. | |
| 7,798,679 B2 | 9/2010 | Kokubo et al. | |
| 7,847,480 B2 | 12/2010 | Yoneda | |
| 7,857,482 B2 * | 12/2010 | Reo et al. ........................ 362/225 |
| 7,880,188 B2 | 2/2011 | Blumel et al. | |
| 7,942,558 B2 | 5/2011 | Zweig et al. | |
| 8,186,847 B2 * | 5/2012 | Hu et al. ........................ 362/225 |
| 8,556,452 B2 * | 10/2013 | Simon et al. ............. 362/217.07 |
| 2005/0201118 A1 | 9/2005 | Godo | |
| 2006/0198144 A1 | 9/2006 | Miyairi et al. | |
| 2006/0232961 A1 | 10/2006 | Pfund | |
| 2008/0043466 A1 | 2/2008 | Chakmakjian et al. | |
| 2008/0054281 A1 | 3/2008 | Narendran et al. | |
| 2008/0198600 A1 | 8/2008 | Crandell et al. | |
| 2009/0002990 A1 | 1/2009 | Becker et al. | |
| 2009/0059620 A1 | 3/2009 | Chen | |
| 2009/0166653 A1 | 7/2009 | Weaver, Jr. et al. | |
| 2009/0225543 A1 | 9/2009 | Jacobson et al. | |
| 2009/0284951 A1 | 11/2009 | Muschaweck | |
| 2010/0027256 A1 | 2/2010 | Kinoshita | |
| 2010/0110722 A1 | 5/2010 | Sin | |
| 2010/0195335 A1 | 8/2010 | Allen et al. | |
| 2011/0085336 A1 | 4/2011 | Blumel et al. | |
| 2011/0141729 A1 * | 6/2011 | Yang ....................... F21S 4/008 362/235 |
| 2011/0141734 A1 * | 6/2011 | Li ............................. F21K 9/17 362/235 |
| 2011/0228528 A1 * | 9/2011 | Yang ....................... F21S 4/008 362/235 |

FOREIGN PATENT DOCUMENTS

| | | |
|---|---|---|
| DE | 298 14 243 U1 | 12/1998 |
| EP | 0 751 340 A2 | 1/1997 |
| EP | 0 971 186 B1 | 1/2000 |
| EP | 1 717 627 A1 | 11/2006 |
| EP | 1 860 467 A1 | 11/2007 |
| JP | 2009043686 A | 2/2009 |
| WO | 98/14740 A1 | 4/1998 |
| WO | 2008/090574 A1 | 7/2008 |
| WO | 2009/052172 A2 | 4/2009 |
| WO | 2012072387 A1 | 6/2012 |

OTHER PUBLICATIONS

Klaus Schmid, International Search Report and Written Opinion of the International Searching Authority for PCT/US12/23965, Jun. 1, 2012, pp. 1-10, European Patent Office, Rijswijk, The Netherlands.

\* cited by examiner

RETROFIT-STYLE LAMP AND FIXTURE, EACH INCLUDING A ONE-DIMENSIONAL LINEAR BATWING LENS

CROSS-REFERENCE TO RELATED APPLICATION

The present application is a continuation of U.S. patent application Ser. No. 12/636,524, entitled "RETROFIT-STYLE LAMP AND FIXTURE, EACH INCLUDING A ONE-DIMENSIONAL LINEAR BATWING LENS", filed Dec. 11, 2009, from which priority is claimed and the entire contents of which are hereby incorporated by reference.

TECHNICAL FIELD

The present invention relates to lamps, and more specifically, to retrofit-style lamps incorporating a lens.

BACKGROUND

Enclosed storage structures, such as refrigeration cases, have long had light sources and light fixtures disposed within to provide light to anyone accessing an item or items stored within the structure. Typically, such a fixture uses one or more fluorescent bulbs, usually in the shape of a tube, to disperse light within the enclosed space defined by the storage structure. Such fixtures may be located along the front corners of a vertically-elongated storage structure, such as on either side of a door that opens to the left or right, or may be located along a top corner or a front edge, when the storage structure is horizontally-elongated. When a fluorescent tube breaks or otherwise ceases to function for any reason, the non-functioning tube is removed, and a new one is put into the fixture.

While fluorescent tubes are reasonably low in cost, and maintenance of fixtures including fluorescent tubes is reasonably easy and also low cost, a typical fluorescent-based bulb is not as energy-efficient or as long-lasting as a typical light emitting diode (LED) light source. Thus, lamps and fixtures that employ LEDs instead of fluorescent tubes are becoming increasingly popular.

SUMMARY

Conventional techniques for providing light within an enclosed storage structure, such as a refrigeration case, using an LED-based light source suffer from a variety of faults. A conventional LED-based fixture typically requires a 1:1 ratio between the LED sources and the optics used, and thus the optics is typically injection molded. That is, each LED chip has its own optic (i.e., lens). This is due, in part, to attempting to compensate for the less-than uniform distribution of light a conventional LED-based fixture provides, compared to a conventional fluorescent-based fixture. For a typical fixture measuring four feet in length, there may be ten or twelve lenses present. In some configurations, should a lens break or otherwise need to be replaced, it is not possible to simply replace the single lens, but rather the entire fixture must be replaced. The same is true for the LED chips in some configurations (i.e., if one chip breaks or otherwise needs to be replaced, the entire fixture must be replaced, not just the one chip, or an array of chips). This makes a conventional LED-based light source more expensive to maintain over time than conventional fluorescent light sources, despite the cost savings of using more energy efficient LEDs in place of conventional fluorescent light sources.

Further, the 1:1 ratio between the LEDs/LED chips and the optics means that a retrofit-style option replacement of a conventional light source is impossible. (A retrofit-style option is one where a conventional light source in an existing fixture is replaced by an LED-based light source and appropriate changes are further made to the ballast and/or the power supply of the existing fixture, so as to allow the fixture to properly power and operate the LEDs. Thus, a retrofit-style replacement may result in the replacement of not only the light source, but also the existing ballast and/or power supply of the existing fixture. In contrast, a true retrofit option would replace the conventional light source in an existing fixture with an LED-based light source, but would not require any changes to the already-existing ballast and/or power supply.) That is, the 1:1 ratio makes it impossible to add an LED-based light source and its related optics to an already-existing fixture, where they would replace the conventional fluorescent tube (leaving aside the issue of whether the current ballast and/or power supply used by the already-existing fixture would be capable of supporting the LEDs). The entire fixture must be removed and replaced, adding to installation costs in comparison to a retrofit-style solution. Further, conventional LED-based fixtures for refrigeration cases and similar structures are typically larger and bulkier in terms of space occupied than conventional fluorescent fixtures for the same structures. In some structures, the conventional LED-based fixture will not fit into the structure properly. In other structures, even if the conventional LED-based fixture does fit, it takes up more space than a conventional fluorescent fixture, leaving less space for products within the case or structure.

Embodiments of the present invention provide a retrofit-style solution for use with fixtures already located within enclosed storage structures, such as but not limited to refrigeration cases and other similar structures. The retrofit-style solution lamp described herein may use LED-based light sources, making it more energy-efficient and having a longer life than conventional light sources, such as conventional fluorescent tube lamps, and has its own incorporated optic that produces a dispersion of light that better illuminates an enclosed storage structure, such as a refrigeration case. When configured as a retrofit-style lamp, the solution replaces a conventional fluorescent tube lamp, providing the energy-efficiency and long life benefits of LED-based light sources. When configured as a fixture, the solution replaces existing conventional fluorescent fixtures as well as existing conventional LED-based fixtures with a fixture that provides energy efficiency, longer life, and a better dispersion of light, as well as being easier and less expensive to maintain and repair.

In an embodiment, there is provided a retrofit-style lamp. The retrofit-style lamp includes a plurality of light sources and a one-dimensional linear batwing lens. The one-dimensional linear batwing lens beam shapes light emitted by at least two light sources of the plurality of light sources.

In a related embodiment, the at least two light sources of the plurality of light sources may be located in a region beneath a central portion of the one-dimensional linear batwing lens. In another related embodiment, the plurality of light sources may include a plurality of light-emitting diodes. In still another related embodiment, the one-dimensional linear batwing lens may be scalable in relation to a number of light sources comprising the plurality of light sources.

In yet another related embodiment, the one-dimensional linear batwing lens may be extrudable. In a further related embodiment, the extrudable one-dimensional linear batwing lens may be co-extrudable. In a further related embodiment, the co-extrudable one-dimensional linear batwing lens may be comprised of a first portion and a second portion, wherein the first portion may be comprised of a first material, and wherein the second portion may be comprised of a second material. In another further related embodiment, the co-extrudable one-dimensional linear batwing lens may be comprised of a first portion and a second portion, wherein the first portion and the second portion may be comprised of a material, and wherein the first portion may include a first filter and the second portion may include a second filter.

In yet still another related embodiment, the one-dimensional linear batwing lens may include an upper portion and a lower portion, wherein the upper portion may be located farther from the plurality of light sources than the lower portion, and wherein the upper portion may be divided into a first non-planar section and a second non-planar section. In a further related embodiment, the first non-planar section and the second non-planar section may be similarly shaped. In another further related embodiment, the first non-planar section and the second non-planar section may be of different shapes.

In still another related embodiment, the one-dimensional linear batwing lens may include an upper portion and a lower portion, wherein the upper portion may be located farther from the plurality of light sources than the lower portion, and wherein the upper portion may include a dip. In a further related embodiment, the dip may be characterized by an angle.

In yet another related embodiment, the retrofit-style lamp may further include a housing, wherein the plurality of light sources is arranged within a space defined in part by the housing. In a further related embodiment, the one-dimensional linear batwing lens may be coupled to the housing. In another further related embodiment, the retrofit-style lamp may further include a pair of electrical connectors, wherein a first of the pair of electrical connectors may be attached to a first end of the housing, and wherein a second of the pair of electrical connectors may be attached to a second end of the housing. In a further related embodiment, the one-dimensional linear batwing lens may be coupled to the housing, forming a lens-housing combination, and the pair of electrical connectors may be attached to the lens-housing combination. In a further related embodiment, the retrofit-style lamp may further include an endcap, wherein the endcap is connectable between one of the pair of electrical connectors and the lens-housing combination.

In another embodiment, there is provided an enclosed storage structure lighting fixture. The enclosed storage structure light fixture includes a housing; a power supply, wherein the power supply is connectable to the housing; a plurality of light sources located in a region defined by the housing, wherein the plurality of light sources receive power from the power supply; and a one-dimensional linear batwing lens, coupled to the housing, wherein the one-dimensional linear batwing lens beam shapes light emitted by at least two light sources of the plurality of light sources. In a related embodiment, the one-dimensional linear batwing lens may provide a substantially uniform distribution of light within a space defined in part by an enclosed storage structure, by beam shaping light emitted by the plurality of light sources.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments described herein show a novel retrofit-style lamp suitable for use in storage units such as refrigeration cases. The retrofit-style lamp incorporates its own lens instead of relying on a lens attached to the fixture in which the lamp is placed. The lens is a one-dimensional linear batwing lens, which produces a batwing type of beam pattern by beam shaping light from a plurality of light sources, which may include LED-based light sources. The lens is extruded and is able to be used with any number of light sources. The lamp also includes a housing to which the light sources and the lens are attached, with endcaps including electrical pin connectors affixed to each end of the housing. The endcaps, through the electrical pin connectors, allow the light sources to receive power and produce light, which the incorporated one-dimensional linear batwing lens spreads in a substantially uniform pattern through the storage unit. Thus, the endcaps allow the lamp to be placed in any type of fixture that accepts fluorescent lamp tubes. The retrofit-style lamp may also be modified by removing the endcaps and adding covers with appropriate electrical connectors so as to be used as a fixture, directly attached to a storage unit in replacement of a conventional fluorescent lamp fixture.

Figure 1:
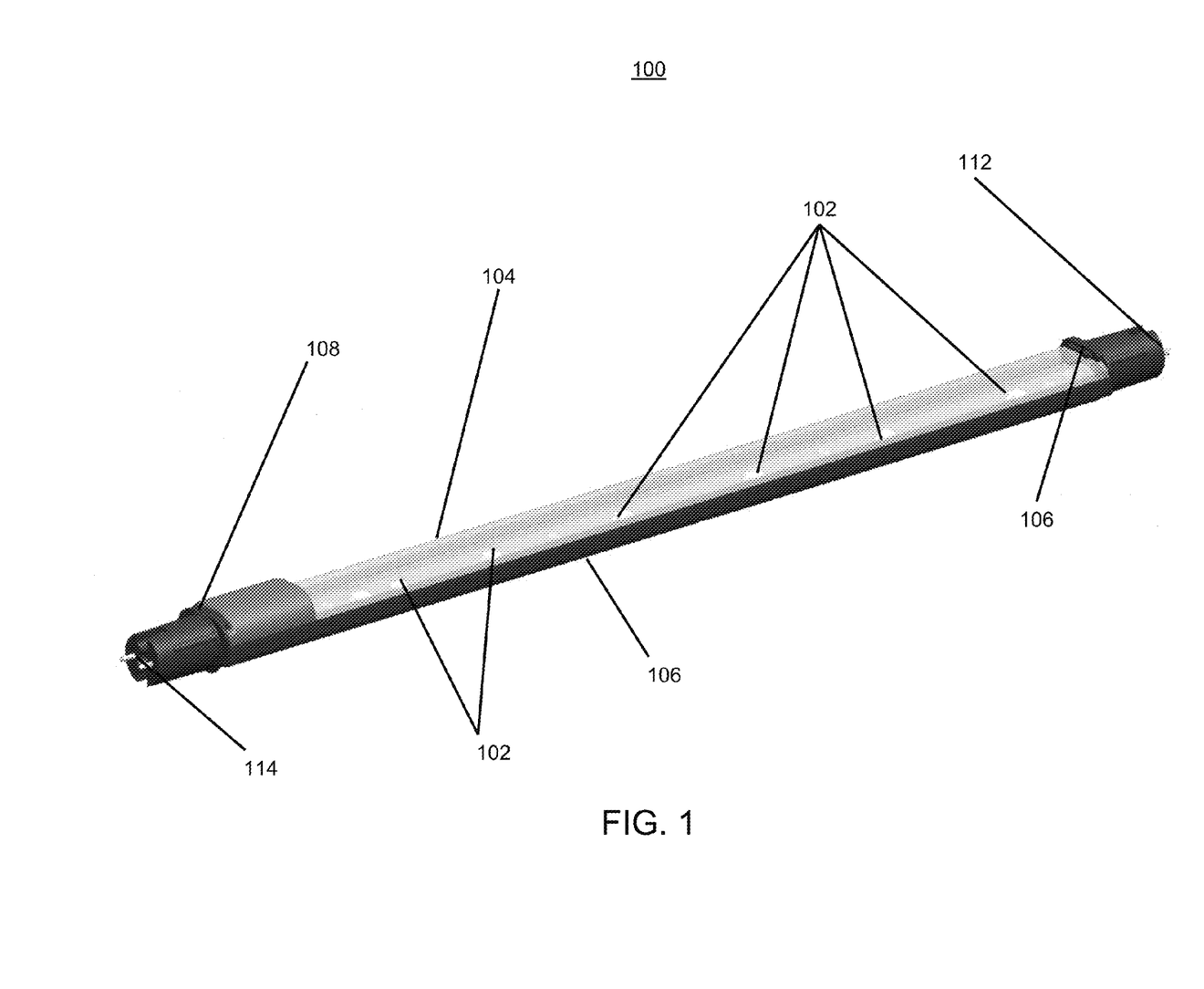
FIG. 1 shows a retrofit-style lamp including a one-dimensional linear batwing lens according to embodiments disclosed herein.
Figure 2:
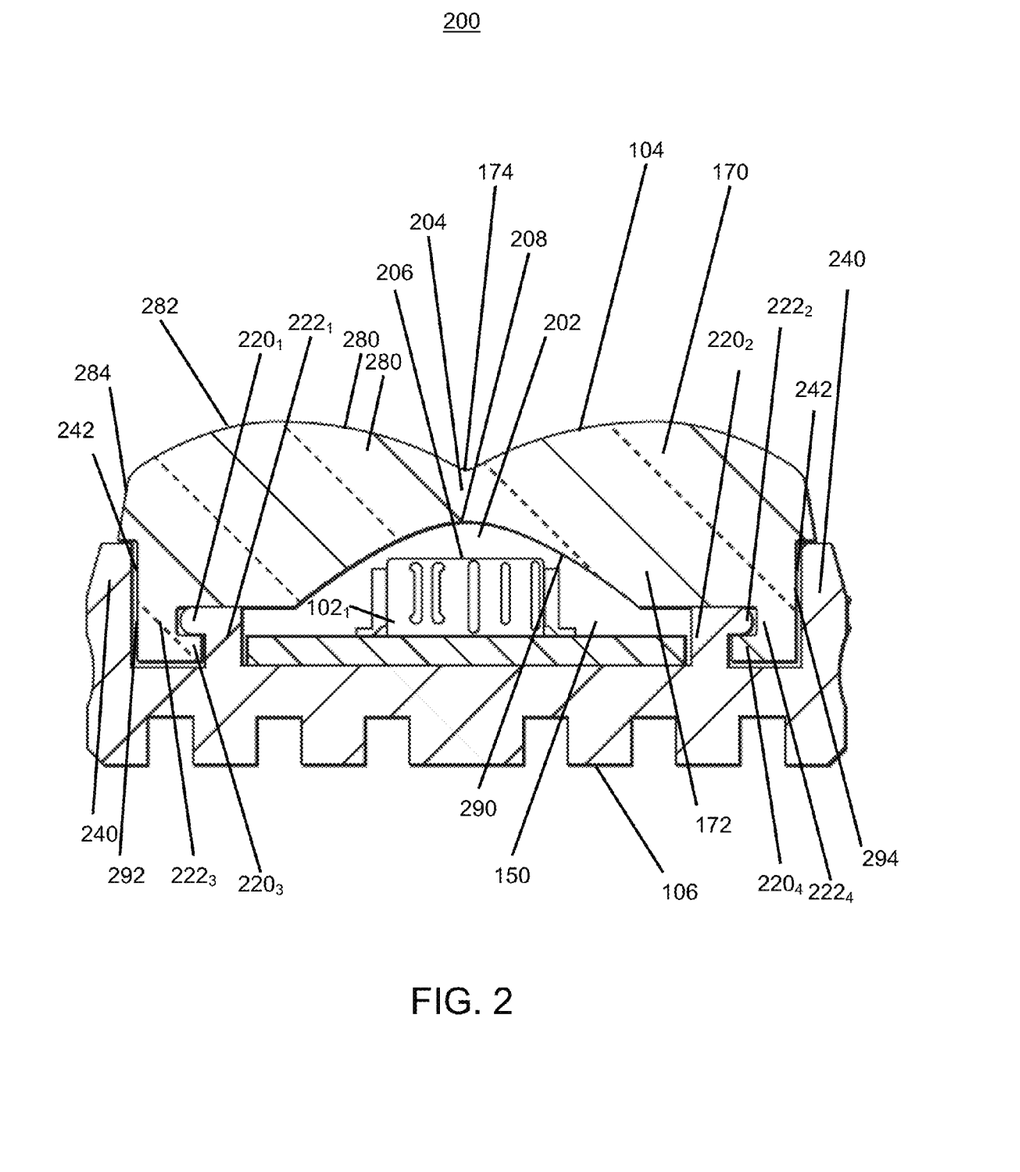
FIG. 2 illustrates a sectional cross-view of a housing including attached light sources and an attached one-dimensional linear batwing leans.
Figure 3:
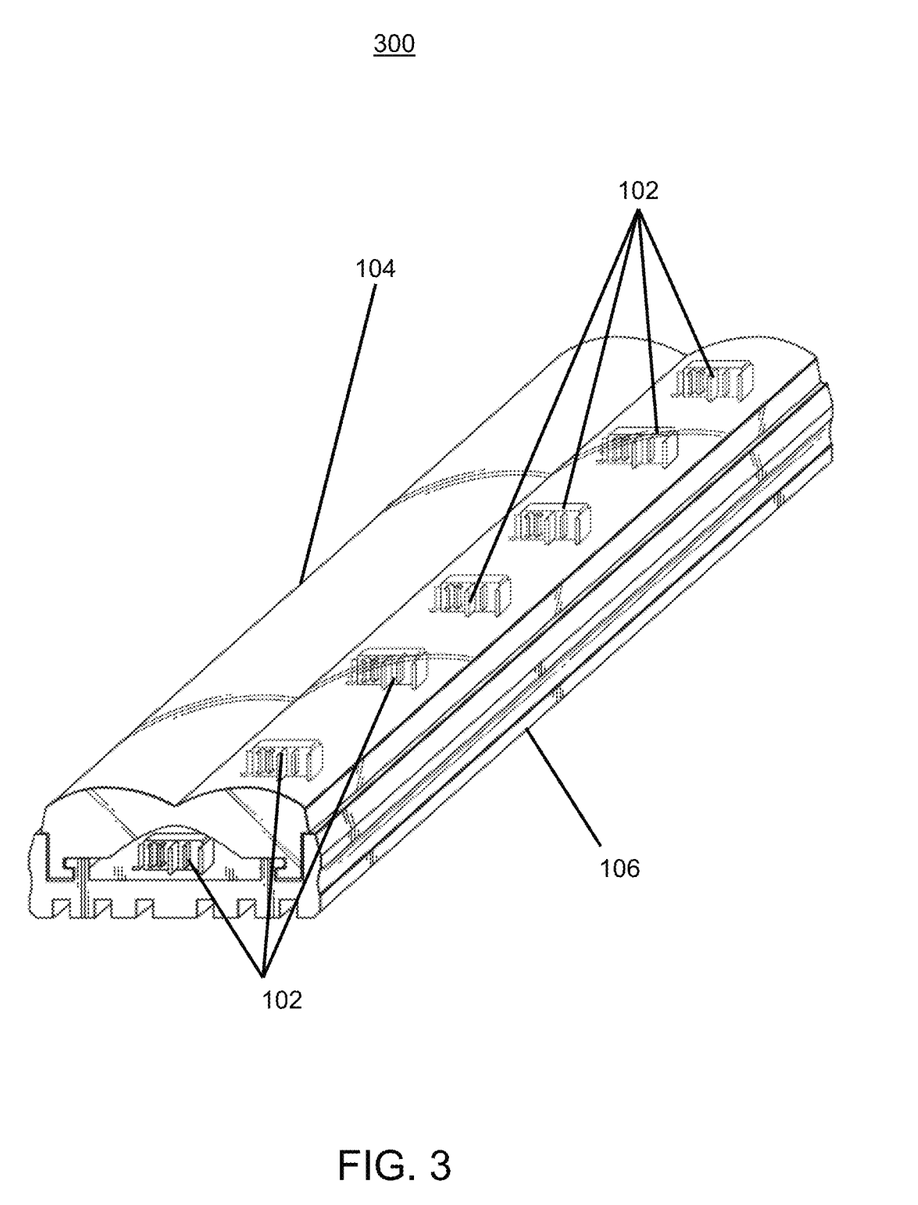
FIG. 3 shows a profile view of an open-ended light fixture having a housing including attached light sources and an attached one-dimensional linear batwing lens, wherein the light sources are not powered and the interior of the housing is visible though the lens.

FIG. 1 shows a retrofit-style lamp 100 (including and corresponding to a cross-sectional view 200 in FIG. 2 and a profile sectional view 300 in FIG. 3) including a plurality of light sources 102, a one-dimensional linear batwing lens 104, a housing 106, a pair of endcaps 108 and 110, and a pair of electrical connectors 112 and 114. Thus, the one-dimensional linear batwing lens 104 is incorporated into the retrofit-style lamp 100, such that the fixture (not shown) into which the retrofit-style lamp 100 is placed does not need to have an optic or optics (i.e., lens/lenses) of its own. The retrofit-style lamp 100 is suitable for placement in any type of fixture, such as but not limited to a conventional fluorescent tube lamp fixture (not shown). The one-dimensional linear batwing lens 104 is coupled to the housing 106, as seen most easily in FIG. 2, to form an outer body of the retrofit-style lamp 100. The one-dimensional linear batwing lens 104 may be coupled to the housing 106 in any known way. For example, in some embodiments, the one-dimensional linear batwing lens 104 and the housing 106 are each shaped so as to form as interlocking connection. An example of such an interlocking connection is shown in FIG. 2, where the one-dimensional linear batwing lens 104 and the housing 106 each include a tab $220_N$ attached to a post $222_N$, such that the tabs $220_3$ and $220_4$ on the one-dimensional linear batwing lens 104 may be slid into the two cavities created by the tabs $220_1$ and $220_2$ and the posts $222_1$ and $222_2$ of the housing 106, keeping the one-dimensional linear batwing lens 104 and the housing 106 connected. Note that the tabs $220_N$ and the posts $222_N$, in some embodiments, are created from the same material as the housing 106 and/or the one-dimensional linear batwing lens 104 and are a solid part of the housing 106 and/or the one-dimensional linear batwing lens 104, such that the tabs $220_N$ and the posts $222_N$ are created when the housing 106 and/or the one-dimensional linear batwing lens 104 is created (i.e., shaped). Alternatively, in some embodiments, the tabs $220_N$ and the posts $222_N$ are separate from the housing 106 and/or the one-dimensional linear batwing lens 104 and must be connected or otherwise attached thereto (e.g., by use of an epoxy or other adhesive material, or through use of a mechanical connection). Alternatively, in some embodiments, the posts $222_N$ are a solid part of the housing 106 and/or the one-dimensional linear batwing lens 104, as described above, and the tabs $220_N$ are separate and must be connected or otherwise attached to the corresponding posts $222_N$ (e.g., by use of an epoxy or other adhesive material, or through use of a mechanical connection). Further, in some embodiments, the connection of the housing 106 and the one-dimensional linear batwing lens 104 is outside of the active optical field of the one-dimensional linear batwing lens 104, so that the housing 106 retains and supports the one-dimensional linear batwing lens 104 without disturbing the beam pattern created by the beam shaping of the one-dimensional linear batwing lens 104, acting on light from the plurality of light sources 102. Thus, it is possible to exchange a different lens (including a different one-dimensional linear batwing lens) for the one-dimensional linear batwing lens 104 that is originally part of the retrofit-style lamp 100, should (for example) the original one-dimensional linear batwing lens 104 break or otherwise need to be replaced, or should a different optic be necessary and/or desired for the retrofit-style lamp 100.

The housing 106 may be made of any material that serves a thermal management function. Thus, in some embodiments, the housing 106 serves as a heat sink for any heat created by the retrofit-style lamp 100 and/or any of its components, such as heat created by, for example, the plurality of light sources 102). The housing 106 is also extrudable (i.e., may be formed having a desired cross-section by being forced through a die). In some embodiments, the housing 106 is made of aluminum. In other embodiments, the housing 106 may be made of, for example but not limited to, sheet metal, a plastic material, and the like. The housing 106 may be of any shape that allows the retrofit-style lamp 100 to fit into a lighting fixture. The housing 106, as described above, must be able to be connected to the one-dimensional linear batwing lens 104, using, for example, any of the connection mechanisms described above. In some embodiments, the housing 106 has a low profile, which allows the retrofit-style lamp 100 to be placed into, for example, conventional fluorescent tube fixtures. In some embodiments, upper walls 240 of the housing 106 (seen most easily in FIG. 2) provide a precise mechanical cutoff at edges 242 of the housing 106 to eliminate reverse glare from the plurality of light sources 102.

The pair of electrical connectors 112 and 114 are located, respectively, on either end of the retrofit-style lamp 100. The first of the pair of electrical connectors 112 is attached to a first end 182 of the housing 106, and the second of the pair of electrical connectors 114 is attached to a second end 184 of the retrofit-style lamp 100. The pair of electrical connectors 112 and 114 may be any known type of electrical connector, such as but not limited to a pair of two-pin connector as is typically used on conventional fluorescent lamp tubes. The pair of electrical connectors 112 and 114 provide the retrofit-style lamp 100 with power received from the fixture (not shown) into which the retrofit-style lamp 100 is placed. The power received by the pair of electrical connectors 112 and 114 is sent to the plurality of light sources 102 through any power-conducting material, such as but not limited to wire, or pin connectors located on a printed circuit board (PCB) that includes any number of the plurality of light sources 102. The pair of electrical connectors 112 and 114, in some embodiments, are connected to the joined one-dimensional linear batwing lens 104 and housing 106 (which may be considered to be a lens-housing combination). In some embodiments, the pair of electrical connectors 112 and 114 are directly connected to the lens-housing combination. Alternatively, as is shown in FIG. 1, the pair of endcaps 108 and 110 is interposed between the lens-housing combination and the pair of electrical connectors 112 and 114. That is, either of the pair of endcaps 108 and 110 is connectable between one of the pair of electrical connectors 112 and 114, and the lens-housing combination. For example, as shown in FIG. 1, a first of the pair of endcaps 108 is connected between the first of the pair of electrical connectors 112 and the interconnected one-dimensional linear batwing lens 104 and the housing 106, and the second of the pair of endcaps 110 is connected between the second of the pair of electrical connectors 114 and the interconnected one-dimensional linear batwing lens 104 and the housing 106. Thus, any electrical connection between either or both of the pair of electrical connectors 112 and 114 and the plurality of light sources 102 must be maintained (i.e., not interrupted, severed, or otherwise blocked by) the pair of endcaps 108 and 110. In some embodiments, the pair of endcaps 108 and 110, with the exception of an electrical connection to the pair of electrical connectors 112 and 114, seal off the interior of the interconnected one-dimensional linear batwing lens 104 and the housing 106 (i.e., the lens-housing combination). The pair of endcaps 108 and 110 may be made of any material that is able to withstand any heat generated by the retrofit-style lamp 100 without becoming deformed, and without either of the pair of endcaps 108 and 110 becoming disengaged or otherwise disconnected from the other components of the retrofit-style lamp 100. In some embodiments, an endcap and an electrical connector may be a single component, while alternatively, in other embodiments, an endcap and an electrical connector may be discrete components that must be connected in some manner. Both the pair of endcaps 108 and 110 and the pair of electrical connectors 112 and 114 may be joined to other components of the retrofit-style lamp 100 using any available connection mechanisms and/or materials (for example, but not limited to, mechanical connections, adhesive-based connections, combinations thereof, and so on). In some embodiments, one or both of the pair of endcaps 108 and 110 may be shaped or otherwise formed so that, when the retrofit-style lamp 100 is placed into a fixture, proper engagement of the retrofit-style lamp 100 with the fixture results in the endcap/endcaps "locking" the retrofit-style lamp 100 into place, or otherwise indicating that the retrofit-style lamp 100 has been properly installed into the fixture. In some embodiments, this functionality is found on one or both of the pair of electrical connectors 112 and 114. Alternatively, in some embodiments where the pair of endcaps 108 and 110 and the pair of electrical connectors 112 and 114 are formed into a pair of single pieces (i.e., an endcap-electrical connector combination), the "locking" and/or indicator functionality described above is found in one or both of the endcap-electrical connector combinations.

As seen in FIGS. 2 and 3, the plurality of light sources 102 is arranged within a space 150 defined in part by the housing 106. The space 150 may also be defined in part by the one-dimensional linear batwing lens 104, as well as, or alternatively by, the connection mechanism between the housing 106 and the one-dimensional linear batwing lens 104. The plurality of light sources 102 may be any type of light source capable of producing light that may be beam shaped by the one-dimensional linear batwing lens 104. In some embodiments, the plurality of light sources 102 are a plurality of light-emitting diode (LED)-based light sources, such as but not limited to a plurality of light-emitting diodes (LEDs), a plurality of organic light-emitting diodes (OLEDs), combinations thereof, and the like. In some embodiments, the retrofit-style lamp 100 uses Golden Dragon® LEDs made by OSRAM Opto Semiconductors of Regensburg, Germany, and Sunnyvale, Calif., USA. A single LED $102_1$ is shown in FIG. 2. The plurality of LED-based light sources may be arranged, as is well-known in the art, on one or more printed circuit boards (PCBs) that extend from one part of the retrofit-style lamp 100 to another. Where two or more PCBs are used in the retrofit-style lamp 100, the PCBs are electrically connected to each other to allow all of the LED-based light sources on all the PCBs to be powered from the same source (e.g., the fixture into which the retrofit-style lamp 100 is attached). Any PCBs used are sized to fit within the retrofit-style lamp 100, which in some embodiments is approximately 1.5 inches wide at its widest point. The one-dimensional linear batwing lens 104 beam shapes light emitted by at least two light sources of the plurality of light sources. The dispersion of light created (i.e., beam shaped) by the one-dimensional linear batwing lens 104 is a batwing dispersion, regardless of the number of the light sources, or type of light sources, used. Thus, it possible to use any number of light sources, including any number of LEDs, with the one-dimensional linear batwing lens 104; for example, see FIG. 3. The one-dimensional linear batwing lens 104 therefore may be said to be scalable, such that no change is required to the lens to produce a batwing dispersion even if the number of light sources used in the retrofit-style lamp 100 changes.

As shown most clearly in FIG. 2, which is a cross-section of the retrofit-style lamp 100 shown in FIG. 1, and FIG. 3, which is a profile view of a section of the retrofit-style lamp 100 shown in FIG. 1, the plurality of light sources 102 are located in a region 202 beneath a central portion 204 of the one-dimensional linear batwing lens 104. Referring just to FIG. 2 now, in some embodiments, the distance between the top of a light source $102_1$ (e.g., a single LED or a chip of LEDs) located in the region 202, measured from the center 206 of the light source $102_1$, and the bottom edge of the one-dimensional linear batwing lens 104 (i.e., the part of the one-dimensional linear batwing lens 104 that is facing towards the plurality of light sources), measured from the center 208 of a bottom edge 290 of the one-dimensional linear batwing lens 104, is 3.2 millimeters.

As used throughout, the term retrofit-style lamp is one where a conventional light source in an existing fixture is replaced by an LED-based light source and appropriate changes may be further required to at least one of the ballast and/or the power supply of the existing fixture, so as to allow the fixture to properly power and operate the LEDs. Thus, a retrofit-style lamp replaces the conventional light source, and in some embodiments, may require the existing ballast and/or power supply of the existing fixture to also be replaced. In contrast, a retrofit lamp would replace the conventional light source in an existing fixture with an LED-based light source, but would not require any changes to the already-existing ballast and/or power supply of the conventional fixture.

A one-dimensional linear batwing lens, such as the one-dimensional linear batwing lens 104 shown in FIGS. 1-3, will now be described in more detail. A one-dimensional linear batwing lens is a batwing style lens that is extended in one dimension in a linear direction so as to be used with more than a single light source and to produce, through beam shaping, a substantially batwing and/or batwing-type distribution from how many ever light sources are used. The distribution produced by a one-dimensional linear batwing lens is a substantially batwing distribution that is substantially uniform within a defined space, such as but not limited to the interior of a refrigeration case (not accounting for the reflective and/or blocking effects of anything contained within the defined space). The substantial uniformity of the distribution is such that the light, as beam shaped by the one-dimensional linear batwing lens, fills up a defined space. The one-dimensional linear batwing lens 104 is extrudable, which results in less expensive tooling costs when the lens is formed. The one-dimensional linear batwing lens 104 may be made of, for example but not limited to, any transparent polymer that is extrudable, may be connected to a housing without affecting the batwing dispersion of light produced, and is resistant to the heat produced by the plurality of light sources. In some embodiments, the one-dimensional linear batwing lens 104 is made from an acrylic, a polycarbonate (i.e., plastic), or glass, or some combination thereof.

In some embodiments, the extrudable one-dimensional linear batwing lens 104 is co-extrudable, that is, one portion of the lens is made from a first material and the other portion of the lens is made from a second material. Thus, for example, the one-dimensional linear batwing lens 104 may be made of both an acrylic and a polycarbonate. In such embodiments, the co-extrudable one-dimensional linear batwing lens may be comprised of a first portion and a second portion. The first portion is comprised of a first material and the second portion is comprised of a second material. The one-dimensional linear batwing lens 104 may be divided into two portions by a straight plane that intersects (i.e., crosses) the entirety of the one-dimensional linear batwing lens 104 in any direction. The one-dimensional linear batwing lens 104 may, alternatively, be divided into two portions by a curved surface that intersects (i.e., crosses) the entirety of the one-dimensional linear batwing lens 104 in any direction. Thus, in some embodiments, the division of the one-dimensional linear batwing lens 104 may be into equal portions (e.g., two halves, each of the same size) or into two unequal portions. In some embodiments, the one-dimensional linear batwing lens 104 may be formed of more than two materials, and thus may be divided into more than two portions, where each portion is made of a different material. Further, in some embodiments, the one-dimensional linear batwing lens 104 may be made of two materials, but may include more than two portions. Thus, instead of being divided by, for example, a single intersecting plane, the one-dimensional linear batwing lens 104 in such embodiments may be divided by a plurality of intersecting planes, where each plane crosses two distinct outer boundaries of the one-dimensional linear batwing lens 104. Of course, any type of dividing shape may be used. For example, if looking at the cross-section shown in FIG. 2, there may be a first plane (not shown) that intersects the one-dimensional linear batwing lens 104 in a vertical direction (i.e., from top to bottom, or vice versa), and there may be a second plane that intersects the one-dimensional linear batwing lens 104 in a horizontal direction (i.e., from left to right, or vice versa). This would create four distinct portions of the one-dimensional linear batwing lens 104, and each portion may be made from a different material, or one portion may be made of a first material and the remaining portions from a second material, or two portions may be made of a first material and the remaining portions from a second material, and so on.

In some embodiments, the one-dimensional linear batwing lens 104 may be made of a material (e.g., acrylic), but may still be divided into portions (two or more). In such embodiments, each portion of the one-dimensional linear batwing lens 104 will be made of the material, but a first portion may include a first filter, a second portion may include a second filter, and so on. As described above with regards to how different materials may be used for the one-dimensional linear batwing lens 104, similarly, different filters may be applied to different portions of the one-dimensional linear batwing lens 104 in any combination. A filter may include, but is not limited to, different colors, different textures, different diffusion levels, and so on.

As described above, the one-dimensional linear batwing lens 104 may be divided into different portions, for example, into two different portions by a horizontal plane that divides the one-dimensional linear batwing lens 104 into an upper portion 170 and a lower portion 172 (shown in FIG. 2), where the upper portion 170 is located farther from the plurality of light sources 102 than the lower portion 172. The upper portion 170 may then be divided into a first non-planar section and a second non-planar section, for example by a vertical plane that bisects the upper portion 170 (not shown). Thus, the one-dimensional linear batwing lens 104 may be said to be bi-modal. The upper portion 170, as shown in FIG. 2, may include a dip 174 that is created by the shape of the outermost edge of the upper portion 170 (i.e, the edge of the one-dimensional linear batwing lens 104 that is farthest from the plurality of light sources 102 and may be touched by a person holding the retrofit-style lamp 100). The dip 174 may be characterized by an angle. For example, the angle of the dip 174 may be between 0° and 180° not inclusive of the end points. In some embodiments, the first non-planar section and the second non-planar section may be similarly shaped, as is shown in FIG. 2. In some embodiments, the first non-planar section and the second non-planar section are of different shapes (not shown). For example, the first non-planar section may have a top surface that is shaped like a parabola, and the second non-planar section may have a top surface that is shaped like a half-circle, so long as the shape produces the desired batwing-like dispersion. Thus, the upper portion 170 may, at its outermost edge, have any shape that produces the desired batwing-like dispersion. The lower portion 172 may similarly be of any non-linear shape that results in two cylindrical arcs that are not tangent at the joint (i.e., not a continuous cylindrical arc). The outermost edge of the lower portion 172 (i.e., the edge closest to the plurality of light sources 102) may thus be of any non-linear shape, as long as it corresponds to the shapes of the upper portion 170 of the lens, because the upper portion 170 and the lower portion 172 work together to produce the desired batwing dispersion. Of course, changing the shape of the one-dimensional linear batwing lens 104 may result in changes to the width and/or the thickness of the one-dimensional linear batwing lens 104.

In an example embodiment, the one-dimensional linear batwing lens 104 measures 1.386 inches at its widest point (i.e., in a horizontal direction), and measures 0.536 inches at its tallest point (i.e., in a vertical direction), 0.358 inches without including the height of the post $222_3$ or $222_4$. The radius of curvature at the dip 174 is R.047, while the radius of curvature at a first curved edge 280 and a second curved edge 282 of the upper portion 170 is R.656, as well as the radius of curvature at a side edge 284. In embodiments where the upper portion 170 is equal on both sides of the dip 174, the same radii of curvature are found on both sides of the upper portion 170. The space between the upper portion 170 at the dip 174 and the center 208 of the bottom edge 290 of the one-dimensional linear batwing lens 104 is 0.100 inches. The radius of curvature of the bottom edge 290 on either side of the center 208 is R.698. In embodiments where the one dimensional linear batwing lens 104 includes posts 222 to connect to the housing 106, the distance between a side edge 292 of the post $222_3$ and a side edge 294 of the post $222_4$ is 1.310 inches plus or minus 0.020 inches.

In some embodiments, the retrofit-style lamp 100 may include only a single endcap and a single electrical connector at one end, with the other end including only a closure that seals off the interior of the retrofit-style lamp 100. Further, in some embodiments, a number of lens-housing combinations, each including a distinct plurality of light sources and a distinct one-dimensional linear batwing lens, may be placed side-by-side, or otherwise combined together, and then joined to the same endcap/pair of endcaps, and/or the same electrical connector/pair of electrical connectors, to form a retrofit-style lamp. Thus, in some embodiments, the retrofit-style lamp may have a generally linear shape, as the retrofit-style lamp 100 shown in FIG. 1, while in other embodiments, the retrofit-style lamp may have a non-linear shape (for example, but not limited to, an "X" shape, a "+" shape, an "*" shape, a " " shape, and so on). In such embodiments, each distinct arm/leg/side of the shape includes at least one one-dimensional linear batwing lens, such that if the arm/leg/side were separated from the rest and provided power, a batwing dispersion would be produced by at least two source of light associated with the lens.

Figure 4:
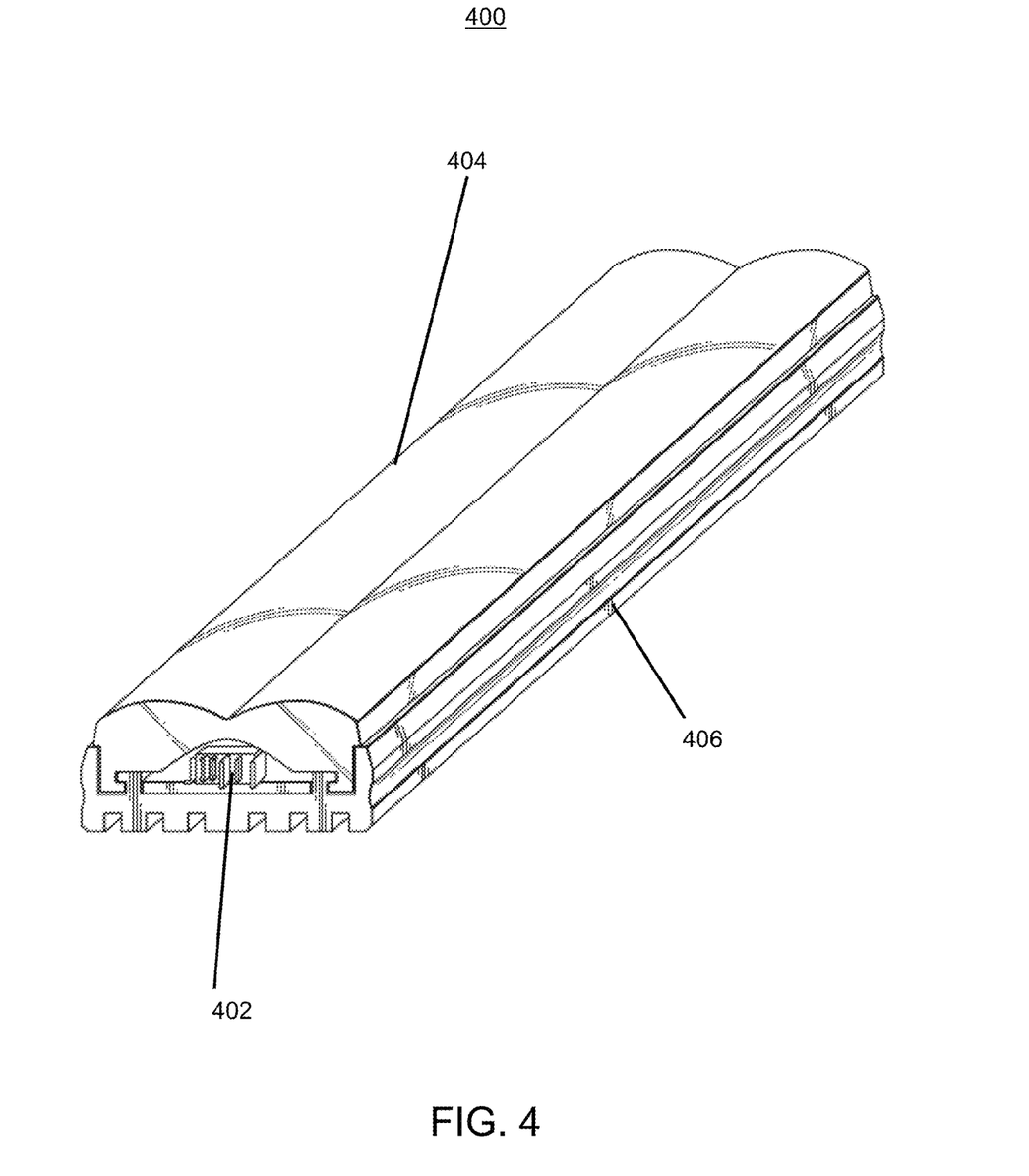
FIG. 4 shows a profile view of a section of a light fixture having a housing including attached light sources and an attached one-dimensional linear batwing lens, wherein the light sources are powered and the interior of the housing is not visible though the lens.

In some embodiments, instead of being configured as a lamp, such as the retrofit-style lamp 100 shown in FIG. 1, the pair of electrical connectors 112 and 114 and the endcaps 108 and 110 may be removed from the retrofit-style lamp 100 to create a fixture 400, a portion of which is shown in FIG. 4. The fixture 400 thus includes a plurality of light sources 402 (only one of which is shown in FIG. 4), a one-dimensional linear batwing lens 404, a housing 406, and a power supply (not shown). The power supply is connectable to the housing 406, and provides power to the fixture 400, and more specifically, to the plurality of light sources 402. The plurality of light sources 402 is located in a region defined, at least in part, by the housing 406, and the plurality of light sources 402 receive power from the power supply. The one-dimensional linear batwing lens 404 is coupled to the housing 406, and beam shapes light emitted by at least two light sources of the plurality of light sources 402. The plurality of light sources 402, the one-dimensional linear batwing lens 404, and the housing 406 each share the same properties and/or configurations (and/or potential properties and/or configurations) as those of the corresponding components (i.e., the plurality of light sources 102, the one-dimensional linear batwing lens 104, and the housing 106) for the retrofit-style lamp 100 shown in FIG. 1. The one-dimensional linear batwing lens 404 of the fixture 400 provides a substantially uniform distribution of light within a space defined in part by an enclosed storage structure (not shown), such as but not limited to a refrigeration case, by beam shaping light emitted by the plurality of light sources 402. Though the portion of the fixture 400 shown in FIG. 4 is open, such that it is possible to see inside the fixture 400, the fixture 400 is fitted with housing closures (not shown in FIG. 4) that seal the interior of the fixture 400. Of course, such housing closures allow for power to be provided from the power supply to the plurality of light sources

402 located in the interior of the fixture 400, for example through the use of one or more wires, or any other suitable electrical transmitters.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lamp comprising:
   a plurality of light sources;
   a housing defining in part a region in which the plurality of light sources is located, wherein the housing includes a connector capable of connecting to a corresponding socket;
   an electrical component to deliver power to the plurality of light sources from the corresponding socket; and
   a one-dimensional linear batwing lens comprising:
      a bottom edge of a lower portion of the one-dimensional linear batwing lens, wherein the bottom edge has a non-linear shape that results in a first cylindrical arc and a second cylindrical arc on opposite sides of a center of the bottom edge, wherein the first cylindrical arc has a first radius of curvature and the second cylindrical arc has a second radius of curvature;
      a left edge of an upper portion of the one-dimensional linear batwing lens, wherein the left edge is located above the housing;
      a right edge of the upper portion, wherein the right edge is located above the housing; and
      a first outer edge and a second outer edge of the upper portion;
      wherein the first outer edge extends convexly out from a center of the upper portion towards the left edge and the second outer edge extends convexly out from the center of the upper portion towards the right edge, defining a dip therebetween, wherein a first angle between the first outer edge and the left edge is obtuse, and wherein a second angle between the second outer edge and the right edge is obtuse.

2. The lamp of claim 1, wherein the bottom edge further comprises a first linear surface extending from the first cylindrical arc away from the region and a second linear surface extending from the second cylindrical arc away from the region, wherein a portion of the first linear surface rests on the housing and a portion of the second linear surface rests on the housing.

3. The lamp of claim 2, wherein the one-dimensional linear batwing lens further comprises:
   a first post extending perpendicularly from the first linear surface; and
   a second post extending perpendicularly from the second linear surface.

4. The lamp of claim 3, wherein the first post comprises a first tab extending perpendicularly from the first post towards the region, and wherein the second post comprises a second tab extending perpendicularly from the second post towards the region.

5. The lamp of claim 4, wherein the housing comprises:
   a first upper wall and a second upper wall on an exterior of the housing, each extending from the housing towards the upper portion of the one-dimensional linear batwing lens;
   a first housing post extending from the housing to the first linear surface of the bottom edge of the one-dimensional linear batwing lens; and
   a second housing post extending from the housing to the second linear surface of the bottom edge;
   wherein the first upper wall and the first housing post define a first cavity to receive the first post, and wherein the second upper wall and the second housing post define a second cavity to receive the second post.

6. The lamp of claim 5, wherein the first housing post comprises a first housing tab extending perpendicularly from the first housing post away from the region, and wherein the second housing post comprises a second housing tab extending perpendicularly from the second housing post away from the region.

7. The lamp of claim 6, wherein the first post and the first tab interact with the first housing post and the first housing tab and the second post and the second tab interact with the second housing post and the second housing tab to couple the one-dimensional linear batwing lens to the housing.

8. The lamp of claim 5, wherein the first upper wall includes a first edge and the second upper wall includes a second edge, such that the first upper wall and the second upper wall each create a precise mechanical cutoff of the one-dimensional linear batwing lens by forming a respective cutoff corner.

9. The lamp of claim 8, wherein the first post includes a first side edge adjacent the first edge of the first upper wall and wherein the second post includes a second side edge adjacent the second edge of the second upper wall.

10. The lamp of claim 9, wherein the first side edge extends past a top of the first upper wall, wherein a first top edge extends from the first side edge to the left edge of the upper portion of the one-dimensional linear batwing lens, forming a first lens corner, and wherein the second side edge extends past a top of the second upper wall, wherein a second top edge extends from the second side edge to the right edge of the upper portion, forming a second lens corner.

11. The lamp of claim 10, wherein the first lens corner of the one-dimensional linear batwing lens rests on the cutoff corner of the first upper wall of the housing, and wherein the second lens corner of the one-dimensional linear batwing lens rests on the cutoff corner of the second upper wall of the housing.

12. The lamp of claim 1, wherein the first outer edge has a first radius of curvature and a second radius of curvature each measured from a location below the first outer edge, wherein the left edge has a third radius of curvature measured from a location below the center of the bottom edge, and wherein the first radius of curvature, the second radius of curvature, and the third radius of curvature are equal.

13. The lamp of claim 12, wherein the second outer edge has a fourth radius of curvature and a fifth radius of curvature each measured from a location below the second outer edge, wherein the right edge has a sixth radius of curvature measured from a location below the center of the bottom edge, and wherein the fourth radius of curvature, the fifth radius of curvature, and the sixth radius of curvature are substantially equal.

14. The lamp of claim 13, wherein the first radius of curvature, the second radius of curvature, the third radius of curvature, the fourth radius of curvature, the fifth radius of curvature, and the sixth radius of curvature are all substantially equal.

15. The lamp of claim 1, wherein the plurality of light sources comprises a plurality of solid state light sources.

16. The lamp of claim 15, wherein the electronic component is a driver for the plurality of solid state light sources.

17. A lighting fixture, comprising:
a plurality of light sources;
a power supply to deliver power to the plurality of light sources;
a housing defining in part a region in which the plurality of light sources is located, wherein the housing includes the power supply; and
a one-dimensional linear batwing lens comprising:
a bottom edge of a lower portion of the one-dimensional linear batwing lens, wherein the bottom edge has a non-linear shape that results in a first cylindrical arc and a second cylindrical arc on opposite sides of a center of the bottom edge, wherein the first cylindrical arc has a first radius of curvature and the second cylindrical arc has a second radius of curvature;
a left edge of an upper portion of the one-dimensional linear batwing lens, wherein the left edge is located above the housing;
a right edge of the upper portion, wherein the right edge is located above the housing; and
a first outer edge and a second outer edge of the upper portion;
wherein the first outer edge extends convexly out from a center of the upper portion towards the left edge and the second outer edge extends convexly out from the center of the upper portion towards the right edge, defining a dip therebetween, wherein a first angle between the first outer edge and the left edge is obtuse, and wherein a second angle between the second outer edge and the right edge is obtuse.

* * * * *

UNITED STATES PATENT AND TRADEMARK OFFICE
CERTIFICATE OF CORRECTION

| | |
|---|---|
| PATENT NO. | : 9,291,330 B2 |
| APPLICATION NO. | : 13/770297 |
| DATED | : March 22, 2016 |
| INVENTOR(S) | : Yi Yang, Douglas Harriot and Li Li |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this
Fourteenth Day of June, 2016

Michelle K. Lee
*Director of the United States Patent and Trademark Office*